United States Patent
Pince et al.

(10) Patent No.: US 7,925,784 B2
(45) Date of Patent: Apr. 12, 2011

(54) RE-DIRECTION OF STREAMING MULTIMEDIA IN WIRELESS COMMUNICATION DEVICES IN RESPONSE TO LOW BATTERY LEVEL

(75) Inventors: Julien Pince, Toulouse (FR); Julien Arnal, Plaisance du Touch (FR); Caroline Giraudon, Toulouse (FR)

(73) Assignee: Motorola Mobility, Inc., Libertyville, IL (US)

(*) Notice: Subject to any disclaimer, the term of this patent is extended or adjusted under 35 U.S.C. 154(b) by 178 days.

(21) Appl. No.: 12/293,194

(22) PCT Filed: Feb. 1, 2007

(86) PCT No.: PCT/US2007/061432
§ 371 (c)(1),
(2), (4) Date: Sep. 16, 2008

(87) PCT Pub. No.: WO2007/117753
PCT Pub. Date: Oct. 18, 2007

(65) Prior Publication Data
US 2009/0055530 A1   Feb. 26, 2009

(30) Foreign Application Priority Data
Mar. 31, 2006 (EP) .................. 06300319

(51) Int. Cl.
*G06F 15/173* (2006.01)
(52) U.S. Cl. ............ 709/239; 709/238; 709/242
(58) Field of Classification Search .......... 709/227, 709/228, 229, 238, 239, 240, 241, 242, 243, 709/244, 220, 203, 218; 455/572; 361/679; 725/114; 370/331, 351
See application file for complete search history.

(56) References Cited

U.S. PATENT DOCUMENTS

| | | | |
|---|---|---|---|
| 6,324,265 B1 | 11/2001 | Christie, IV et al. | |
| 2002/0029258 A1* | 3/2002 | Mousseau et al. | 709/218 |
| 2002/0143866 A1* | 10/2002 | Lewis et al. | 709/203 |
| 2003/0037125 A1* | 2/2003 | Luman et al. | 709/220 |
| 2004/0185838 A1 | 9/2004 | Seligmann | |
| 2004/0264436 A1* | 12/2004 | Hassan et al. | 370/351 |
| 2005/0097618 A1* | 5/2005 | Arling et al. | 725/114 |
| 2005/0159823 A1 | 7/2005 | Hayes et al. | |
| 2005/0160176 A1* | 7/2005 | Seales et al. | 709/229 |
| 2005/0204065 A1 | 9/2005 | Son et al. | |
| 2006/0018283 A1* | 1/2006 | Lewis et al. | 370/331 |
| 2007/0004466 A1* | 1/2007 | Haartsen | 455/572 |
| 2007/0223182 A1* | 9/2007 | Swan et al. | 361/679 |

FOREIGN PATENT DOCUMENTS
EP       0724362 A    7/1996
WO   2005067300 A1   7/2005

OTHER PUBLICATIONS

European Patent Office, Rejection Letter for European Application No. 06300319.58, Oct. 20, 2010, 3 pages.
van Thanh et al., "The Device Management Service" Intelligent Network Workshop 2001, IEEE May 6-9, 2001, pp. 199-211.

* cited by examiner

*Primary Examiner* — Le Luu
(74) *Attorney, Agent, or Firm* — Roland K. Bowler, II

(57) ABSTRACT

A wireless communication device includes a wireless transceiver, a controller having a re-direction output communicably coupled to the wireless transceiver, and a battery device having a battery level output communicably coupled to the controller, wherein the wireless communication device is operable to attempt re-directing streaming content received at the wireless communication device to another entity in response to a battery level signal on the battery level output coupled to the controller.

10 Claims, 2 Drawing Sheets

RE-DIRECTION OF STREAMING MULTIMEDIA IN WIRELESS COMMUNICATION DEVICES IN RESPONSE TO LOW BATTERY LEVEL

FIELD OF THE DISCLOSURE

The present disclosure relates generally to wireless communications and more particularly to re-directing streaming multimedia from one media rendering entity to another, corresponding entities and methods.

BACKGROUND

The Universal Plug and Play (UPnP) standard allows mobile communication devices or entities to discover neighboring UPnP devices and to exchange services with the neighboring devices. The exchange of multimedia content among entities is among the primary interests within the definition of the UPnP services. UPnP enables sending streamed content from a UPnP Media Server to a UPnP media rendering entity. However, UPnP does not allow streaming content to be redirected from one UPnP media rendering entity to another UPnP media rendering entity.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
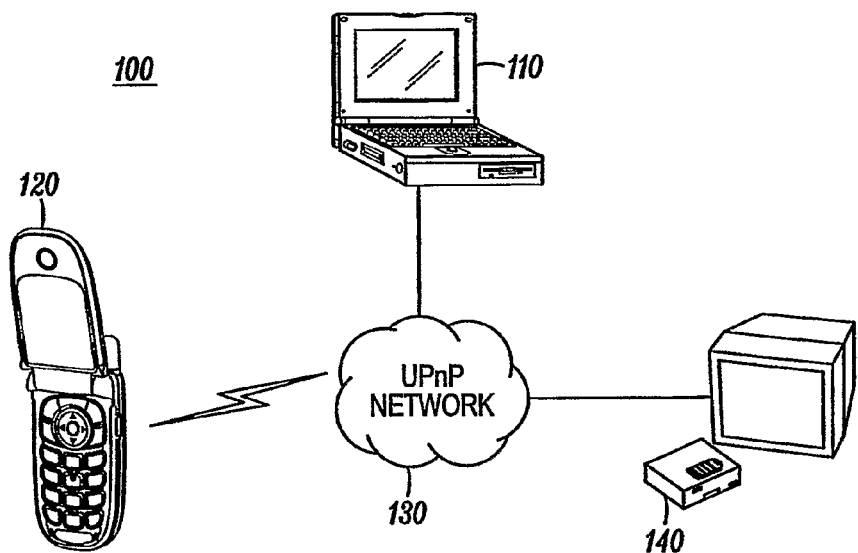
FIG. 1 illustrates a system for exchanging information between communication entities.

In FIG. 1, a communication system 100 provides a medium for exchanging information between communication entities. In the illustrative system, a content server 110 provides multimedia content to another communication entity 120 over a communications network 130. The network 130 may be any single network or a combination of networks, for example, an Internet Protocol (IP) network. In embodiments where the communication entity is a wireless terminal, for example, a mobile telephone, personal digital assistant (PDA), or other device, the network 130 includes or communicates with a wireless network. In one embodiment, the content server 110, the network 130 and the communication entity 120 are compliant with the UPnP media protocol. In UPnP applications, the communication entity would typically connect to the IP network through WiFi or Bluetooth, among other local area networks. The disclosure also applies more generally to other wireless communication networks.

Figure 2:
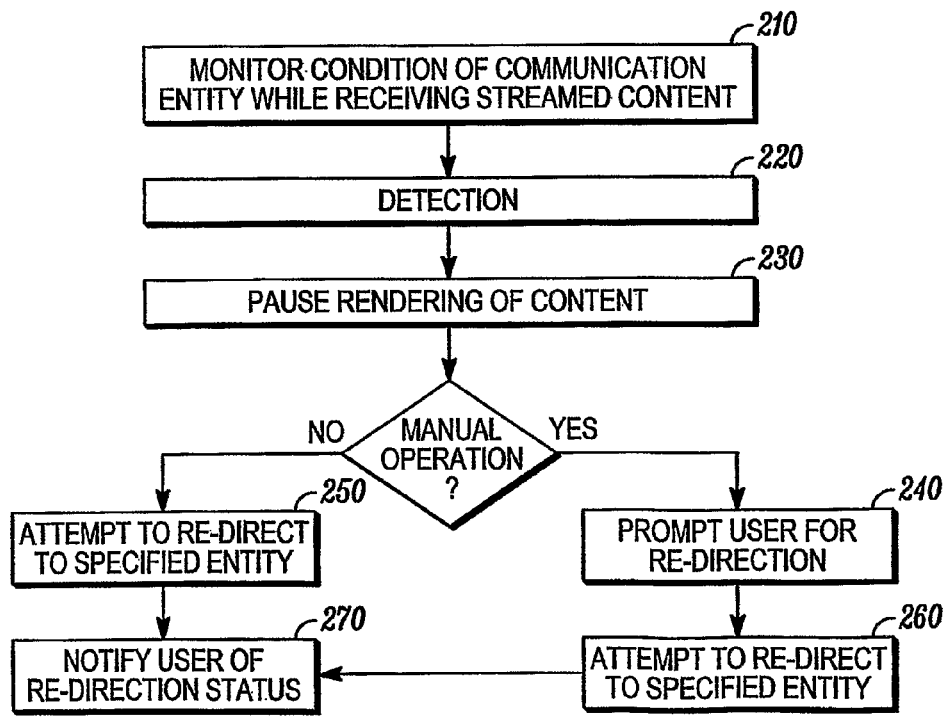
FIG. 2 illustrates a process flow diagram.

In one embodiment, communication terminal receiving a content stream, for example, from a content server, monitors a condition of the communication terminal or entity, as illustrated in block 210 of FIG. 2. In some embodiments, the monitoring occurs while receiving streamed content at the communications entity. Upon detecting the condition, illustrated at block 220 in FIG. 2, the communication terminal attempts to re-direct the streaming content to an entity other than the communication terminal. More generally, the monitoring and detection may occur before any streamed content is received. Then, upon receiving the streamed content, the content may be re-directed to the other entity. FIG. 1 illustrates another entity 140 to which streamed content is re-directed by entity 120.

In one embodiment, the communication terminal detects a user input indicating a desire to re-direct streaming content. In this embodiment, the user could provide some input for example, using a hard or soft switch at a user interface of the device. In other embodiments, the condition may be not necessarily be provided directly by the user. For example, the condition monitored may be a quality of service of the communications link, the available data rate, network load, or some other factor related to the link. In battery operated wireless communication terminals, the condition monitored may be a power level of the battery, as discussed more fully below.

In some embodiments, the communication entity receiving the streaming content also renders the content, rather than merely store it, at the communication entity. In some embodiments where content is being rendered, the rendering is paused and/or stopped after detecting the condition, as illustrated at block 230 in FIG. 2.

Generally, the re-direction of the content may be performed manually or automatically. If re-direction is performed manually, the user may be prompted to re-direct the streaming content, as illustrated at block 240 in FIG. 2. The manual re-direction prompt may be an audible and/or visual display indicator prompting the user to provide some input that initiates the re-direction. The input could be a hard or soft switch input or an audible input or some other input at the communication device. In manual applications, the user may also be prompted to select the entity to which the content is re-directed. Alternatively, the content may be re-directed to a pre-specified entity upon manual initiation by the user. In FIG. 2 at 260, the communication entity attempts to re-direct the content to a specified entity. At 270, the communication entity notifies the user of the status of the re-direction. For example, the user may be notified of a successful or unsuccessful re-direction attempt.

For automatic re-direction applications, in FIG. 2, at 250, the communication device automatically attempts to re-direct the content to a specified entity upon detection of some condition. Various rules may be applied for selecting the entity to which the content is automatically re-directed. A first rule could be to select the first neighboring entity available. An alternative rule could be to select the first available entity on a pre-specified list of entities. These entities could be identified based on Universally Unique Identifier (UUID), Manufacturer, Serial Number, among other identifiers. At 270, the communication entity notifies the user of the status of the re-direction.

The process flow of FIG. 2 may be implemented most efficiently by a processor controlled by programmed code stored in memory. More generally however it may be implemented by one or more equivalent hardware circuits in the communication entity, for example, the wireless device of FIG. 3 discussed further below. In some implementations, a manual operation decision branch is included for considering whether the re-direction is manual or automatic, for example, in embodiments where either configuration may be selected at a user interface of the communication entity.

Figure 3:
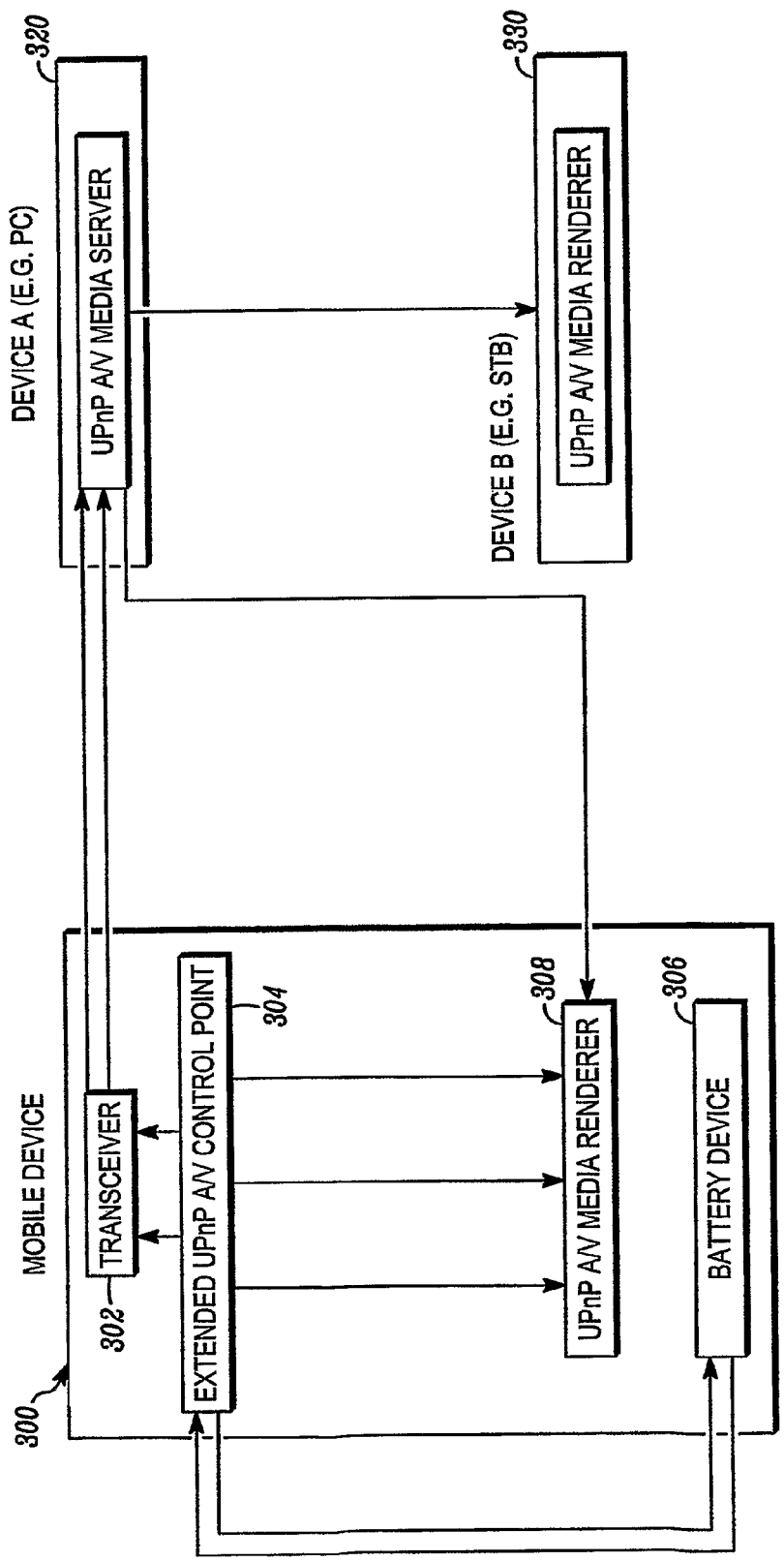
FIG. 3 illustrates a wireless communication entity.

FIG. 3 illustrates a UPnP compliant wireless communication entity or device 300 that communicates with a content server, for example, a personal computer 320 connected to an IP network. The wireless device 300 generally comprises a wireless transceiver 302 for communicating with other entities including the content server 320. The device 300 also comprises a UPnP controller entity 304 having a re-direction output communicably coupled to the wireless transceiver. The exemplary device 300 includes a battery device 306 having a battery level output communicably coupled to the UPnP controller entity 304. The device 300 also includes a content rendering device 308. The UPnP controller entity 304 includes a content rendering output communicably coupled to the content rendering device, wherein the content rendering device is operable to discontinue rendering streamed content in response to a pause or stop signal on the content rendering output of the UPnP controller entity, as discussed further below. In FIG. 3, content is re-directed to device 330, which may render the content and/or store it.

Generally, content is re-directed midstream, without restarting the download or transfer. In some embodiments, a complete copy of the content is transferred to the other entity. For example, the content may be re-directed to the other entity midstream and then the transmission of the content may be re-started to provide any portion of content that was not received by the other entity. Alternatively, the downloading of the content to the other entity may be restarted by the content server upon receipt of the re-direction request.

In FIG. 3, the wireless communication device 300 of FIG. 3 is operable to attempt re-directing streaming content received at the wireless communication device to another entity in response to a battery level signal on the battery level output coupled to the UPnP controller entity. In one embodiment, detecting the condition of the battery includes detecting a power level of the battery. The streaming content received by the wireless communication device is re-directed to the other entity when the power level of the battery satisfies a condition, for example, when the power level of the battery reaches the specified minimum. Battery devices capable of measuring available battery power are known generally to those having ordinary skill in the art.

In the illustrative UPnP compliant device, the battery device communicates directly with the UPnP controller entity. In other embodiments, the battery device communicates indirectly with the UPnP communication entity, for example, by a controller or processor, capable of interfacing with the UPnP controller entity. The interface between the battery device and the controller entity may thus be an open or proprietary interface protocol. In one implementation, the Battery device sends a "low battery" notification to the controller 304, which prompts the re-direction of content. The "low battery" indicator could be set at a fixed threshold, for example, 25 percent power remaining. In such an embodiment, the "low battery" signal may be sent to the UPnP controller entity only when the battery power level reaches the threshold. Alternatively, the battery device may provide a signal indicating the remaining power as a percentage of total power. For example, this variable may have a range from 0 to 100 wherein 100 indicates that the battery is fully charged and 0 indicates that the battery is empty. The controller could use this information along with other information, for example, the operation of other power depleting device or features on the communication entity, to determine whether and when to initiate or prompt the user to initiate re-direction.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication device, comprising:
a wireless transceiver;
a UPnP controller entity having a re-direction output communicably coupled to the wireless transceiver;
a battery device having a battery level output communicably coupled to the UPnP controller entity,
the wireless communication device operable to attempt re-directing streaming content received at the wireless communication device to another entity in response to a battery level signal on the battery level output coupled to the UPnP controller entity; and
a re-direction notification module for producing a notification on the wireless communication user terminal when redirection of the streaming content is successful.

2. The device of claim 1,
a content rendering device,
the UPnP controller entity having a content rendering output communicably coupled to the content rendering device,
the content rendering device operable to discontinue rendering streamed content in response to a stop signal on the content rendering output of the UPnP controller entity.

3. The device of claim 2, a content rendering pause module for pausing the rendering of the streaming content in response to a battery level signal on the battery level output coupled to the UPnP controller entity.

4. The device of claim 1, a user streaming content re-direction module for prompting a user to re-direct the streaming content.

5. The device of claim 1, attempting to re-direct the streaming content includes automatically attempting to re-direct the streaming video to the entity, which is predetermined.

6. A method in a communication terminal, the method comprising:
detecting a condition of the communication terminal;
attempting to re-direct streaming content received by the communication terminal to an entity other than the communication terminal based on the detected condition of the communication terminal;
producing a notification on the communication terminal if redirection of the streaming content is not possible.

7. The method of claim 6,
rendering the streaming content received by the communication terminal,
pausing the rendering of the streaming content after detecting the condition of the communication terminal.

8. The method of claim 7, attempting to re-direct the streaming content includes prompting a user to re-direct the streaming content.

9. The method of claim 7, attempting to re-direct the streaming content includes automatically attempting to re-direct the streaming video to the entity, which is predetermined.

10. The method of claim 6, detecting the condition of the communication terminal includes detecting a user input indicating a desire to re-direct the streaming content.

* * * * *